3,704,249
SYNTHESIS OF THE BIOLOGICALLY ACTIVE
DIASTEREOISOMER OF (—) ZEARALANOL
Robert F. Czaja, Elizabeth, Victor J. Grenda, Warren, and Earl M. Chamberlin, Westfield, N.J., assignors to Merck & Co., Inc., Rahway, N.J.
No Drawing. Filed May 1, 1969, Ser. No. 821,143
Int. Cl. C07d 9/00
U.S. Cl. 260—343.2 F            7 Claims

ABSTRACT OF THE DISCLOSURE

The active growth factor diastereoisomer of 6-(6,10-dihydroxy - undecyl) - β - resorcylic acid - μ - lactone or (—) zearalanol is prepared by stereospecific reduction of the carbonyl moiety of zearalanone, zearalenone, and diether derivatives thereof.

---

This invention relates to the preparation of the biologically active diastereoisomer of 6-(6,10-dihydroxy-undecyl)-β-resorcylic acid-μ-lactone or (—) zearalanol. More specifically, it relates to the preparation of the active diastereoisomer of zearalanol by stereospecific reduction of the carbonyl group of zearalanone, zearalenone, and diether derivatives thereof.

(—) Zearalanol or 6-(6,10-dihydroxy-undecyl)-β-resorcylic acid-μ-lactone, a compound having anabolic, estrogenic, and fertility control properties, has been prepared by catalytic reduction of the olefinic bond and ketone group of the fermentation product zearalenone as described in U.S. Pat. No. 3,239,345; the resulting substance has the structural formula:

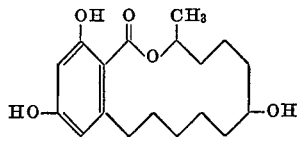

Catalytic hydrogenation of the ketone group of the zearalenone molecule introduces an asymmetric carbon atom and makes two diastereoisomers possible. The diastereoisomers of (—) zearalanol can be distinguished by melting point, and since the higher melting isomer is less soluble, e.g. isopropyl alcohol-water mixtures, the diastereoisomers are separable. The higher melting diastereoisomer has 3-4 times more biological activity than the lower melting material. The active diastereoisomer of (—) zearalanol is a valuable compound possessing anabolic and estrogenic activity as well as fertility control properties.

One object of the present invention is the preparation of the more active diastereoisomer of (—) zearalanol by a method which does not require separation of the two diastereoisomers.

The instant invention is based upon the discovery that the more biologically active diastereoisomer of (—) zearalenol can be prepared readily by reducing the ketone moiety of zearalanone, zearalenone, and 2,4-diether derivatives thereof to the secondary alcohol with selective carbonyl reducing agents.

The starting material of the present invention is the optically active 6 - (10 - hydroxy - 6 - oxo - trans - 1-undecenyl)-β-resorcylic acid-μ-lactone or zearalenone described in United States Pat. No. 3,169,019. Catalytic hydrogenation of the olefinic bond of zearalenone employing the method of United States Pat. No. 3,239,354 produces zearalanone.

The carbonyl reducing agents which are capable of producing the more active diastereoisomer of (—) zearalanol are selected from the following group: Aluminum compounds, e.g. aluminum alkoxides and aluminum alkyls, borane compounds, organo metallic anhydrides, metallic anhydrides, certain Grignard reagents, alkyl or aryl lithium compounds in pyridine, and metallic hydride used in conjunction with sugars. The stereospecific reduction is preferably carried out with the starting material, namely, zearalenone, zearalanone, or 2,4-diether derivatives thereof, dissolved or suspended in a suitable solvent, e.g. methanol, ethanol, propanol, ether, tetrahydrofuran, dioxane, diglyme, and benzene. In general, the chemical reduction reaction can be accomplished at ambient temperatures and ambient pressures. Preferably, the temperatures are from about 0° C. to the boiling point of the solvent for the reaction.

The aluminum reducing agents which can be utilized in preparing the active diastereoisomer of (—) zearalanol include aluminum alkoxides, e.g. aluminum tri-t-butoxide, aluminum tri-isopropoxide, and aluminum alkyls, e.g. triisobutyl aluminum.

Among the borane compounds that are useful in the practice of this invention are alkyl aminoboranes, e.g. isopropylaminoborane, and dialkylboranes, e.g. disiamyl borane.

Various hydride reducing compounds can also be employed in preparing the active diastereoisomer of (—) zearalanol. Aluminum hydrides, e.g. aluminum hydride, diisobutyl aluminum hydride, lithium aluminum hydride, and lithium aluminum alkoxide hydrides, also afford the desired diastereoisomer.

The following organo tin anhydrides are also useful in this invention. Triphenyl tin hydride, diphenyl tin hydride, phenyl tin hydride, tributyl tin hydride, dibutyl tin hydride, and butyl tin hydride.

Metallic boron hydrides, e.g. sodium borohydride, lithium borohydride, potassium borohydride, also produce the desired diastereoisomer of (—) zearalanol.

Certain Grignard reagents, e.g. Grignard reagents derived from optically active or inactive 1-chloro-2-phenyl butane or 1-chloro-3-methyl pentane, also afford the active diastereoisomer of (—) zearalanol.

The use of lithium aluminum hydride in conjunction with certain sugars also produces the active diastereoisomer of (—) zearalanol. The following sugars can be employed in the chemical reduction: 1,2-O-cyclohexylidene-D-glucofuranose, 4,6-O-benzylidene-α-D-glucopyranoside, 1,2-O-isopropylidene-α-D-glucofuranose, and 3-O-benzyl-1,2-O-cyclohexylidene-α-D-glucofuranose.

The olefinic double bond of the (—) zearalenol can be reduced, for example, by hydrogenation in the presence of palladium catalyst on a suitable carrier, e.g. charcoal. Generally, the catalyst contains from about 0.01 to about 10% by weight of the catalytic metal. The catalyst is used in a ratio of generally from 0.02 to 2 grams of catalyst, preferably about 0.1 to 0.5 gram per gram of zearalenone. The reduction may be carried out while the zearalenone is dissolved in a suitable solvent, e.g. an alcohol, especially a lower alkanol such as methanol, ethanol, propanol, isopropanol, at ambient temperatures; e.g. from about 15° C. to 40° C., and ambient pressures, since only the presence of hydrogen is required; however, it is preferred to utilize an elevated pressure, e.g. from about 1 to 50 atmospheres of hydrogen.

The final step in the preparation of the active diastereoisomer is the cleavage of the protecting ether groups with boron trifluoride or boron tribromide. The cleavage reaction is run in solvent, e.g. methylene chloride, at temperatures of from about —10° C. to about +15° C. Removal of the solvent affords crude product which may be purified directly by crystallization from a solvent such as nitromethane, or by chromatography on an absorbent such as silica gel, followed by crystallization from a suitable organic solvent. When the benzyl substituent is employed as the protecting group, it is cleaved during the hydrogenation of the olefinic bond.

The best mode contemplated by applicants for carrying out their invention is more fully illustrated in the following examples. It is to be understood that no limitation is implied or intended except as set forth in the appended claims.

EXAMPLE 1

Aluminum tri-t-butoxide reduction of dimethylzearalenone

To a mixture of 0.700 g. (0.0020 mole) of dimethylzearalenone in 20 g. of dioxane and 0.130 g. (0.0010 mole) of (+) octanol at 60° C. there is added a solution of 0.385 g. (0.0018 mole) of aluminum tri-t-butoxide in 10 ml. of dioxane at 60° C. After five hours, the reaction mixture is cooled to room temperature and 10 ml. of 2 N hydrochloric acid is added. The mixture is concentrated to dryness and extracted with ether. The ether layer is washed with aqueous sodium bicarbonate solution, water, then dried over anhydrous sodium sulfate. After concentration in vacuum the residue is hydrogenated over 5% Pd/C to give dimethylzearalanol. Demethylation with $BF_3$ gives the active growth factor diastereoisomer of 6-(6-dihydroxyundecyl)-$\beta$-resorcylic acid-$\mu$-lactone, M.P. 176–178° C., $$[\alpha]_{365}^{25°} = -98 \pm .5° \text{ C.}$$

(c.=.75%, MeOH).

EXAMPLE 2

Aluminum tri-t-butoxide reduction of dibenzylzearalanone

To a mixture of 0.750 g. (0.0015 mole) of dibenzylzearalanone, 20 g. of dioxane and 0.7 g. (0.007 mole) of (+) pinacoyl alcohol at 60° C. there is added a solution of 0.358 g. (0.0014 mole) of aluminum tri-t-butoxide in 6 ml. of dioxane at 60° C. After six hours, the reaction mixture is cooled to room temperature and 10 ml. of 2 N hydrochloric acid is added. The mixture is concentrated to dryness and extracted with ether. The ether layer is washed with aqueous sodium bicarbonate solution, water, then dried over anhydrous sodium sulfate. Concentration in vacuum gives a product which is hydrogenated with 10% Pd/C to give the active growth factor diastereoisomer of 6-(6,10-dihydroxy-undecyl)-$\beta$-resorcylic acid-$\mu$-lactone, M.P. 177–179° C., $$[\alpha]_{365}^{25°} = -97.8 \pm .5° \text{ C.}$$

(c.=. 81%, MeOH).

EXAMPLE 3

Disiamyl borane reduction of dibenzylzearalenone

A solution of 0.750 g. (0.0015 mole) of dibenzylzearalenone in 25 ml. of THF is added dropwise to a stirred solution of 0.0015 mole of disiamyl borane in 25 ml. of tetrahydrofuran at 0° C. The mixture is stirred for four hours at 0° C., then allowed to warm to room temperature overnight. After oxidation with 4.5 ml. of 0.3 N sodium hydroxide and 0.45 ml. of 30% hydrogen peroxide, the mixture is concentrated to dryness in vacuum. The residue is extracted with ether and the ether layer is washed with water, then dried over anhydrous sodium sulfate. Hydrogenation of this product with 10% Pd/C gives the active growth factor diastereoisomer of 6-(6,10-dihydroxyundecyl)-$\beta$-resorcylic acid-$\mu$-lactone, M.P. 178–181° C., $$[\alpha]_{365}^{25°} = -98.5 \pm .5° \text{ C.}$$

(c.=.95%, MeOH).

EXAMPLE 4

Isopropylamine borane reduction of zearalanone

Isopropylamine borane (0.072 g., 0.001 mole) in 10 ml. of ether is added dropwise to a solution of 0.300 g., 0.00094 mole of zearalanone in 10 ml. of ether. After stirring for two hours the mixture is acidified with aqueous 2 N hydrochloric acid. The ether layer is washed with aqueous bicarbonate solution, water, then dried over anhydrous sodium sulfate. Concentration in vacuum of the organic layer gives the active growth factor diastereoisomer of 6-(6,10-dihydroxyundecyl)-$\beta$-resorcylic acid-$\mu$-lactone, M.P. 178–180° C., $$[\alpha]_{365}^{25°} = -97.5 \pm .5° \text{ C.}$$

(c.=.86%, MeOH).

EXAMPLE 5

Di-isobutyl aluminum hydride reduction of dimethylzearalenone

A solution of 0.145 g. (0.001 mole) of di-isobutyl aluminum hydride in 25 ml. of dry benzene is added dropwise under nitrogen to 0.345 g., 0.001 mole of dimethylzearalenone in 25 ml. of dry benzene at room temperature. The temperature rises to 40° C. during the addition. After stirring for one hour at 25° C., excess reagent is carefully decomposed with methanol in benzene. Aqueous methanol is added and the inorganics are removed by filtration. The organic layer is separated and the intermediate ene-ol is first hydrogenated with 5% Pd/C and then demethylated with $BF_3$ to give the active growth factor diastereoisomer of 6-(6,10 - dehydroxyundecyl)-$\beta$-resorcylic acid-$\mu$-lactone, M.P. 180–181° C., $$[\alpha]_{365}^{25°} = -95.5 \pm .5° \text{ C.}$$

(c.=.83%, MeOH).

EXAMPLE 6

Tri-isobutyl aluminum reduction of zearalanone

Tri-isobutyl aluminum (0.200 g., 0.001 mole) in 50 ml. of dry benzene is added dropwise under nitrogen to 0.300 g. (0.00094 mole) of zearalanone in 50 ml. of dry benzene. After stirring for two hours at room temperature, excess reagent is hydrolyzed on admixture of dilute aqueous sulfuric acid. The benzene layer is washed with aqueous sodium bicarbonate, water, then dried over anhydrous magnesium sulfate. Concentration of the benzene layer in vacuum gives the active growth factor diastereoisomer of 6-(6,10-dihydroxyundecyl)-$\beta$-resorcylic acid-$\mu$-lactone, M.P. 177–179° C.

$$[\alpha]_{365}^{25°} = -96.1 \pm .5° \text{ C.}$$

(c.=.79%, MeOH).

EXAMPLE 7

Triphenyltin hydride reduction of dimethylzearalenone

A solution of 0.350 g., 0.001 mole of triphenyltin hydride in 25 ml. of ether is added under nitrogen to a solution of 0.345 g., 0.001 mole of dimethylzearalenone in ether at room temperature. In five minutes a white solid precipitates. Excess hydride is destroyed on admixture of diethylamine. The insolubles are filtered and the ethereal solution treated with boron trifluoride to effect demethylation. The ene-ol is reduced with 5% Pd/C to give the active growth factor diastereoisomer of 6-(6,10-dihydroxyundecyl)-$\beta$-resorcylic acid-$\mu$-lactone, M.P. 180–182° C., $$[\alpha]_{365}^{25°} = -98.0 \pm .5° \text{ C.}$$

(c.=.80%, MeOH).

EXAMPLE 8

Phenyl tin tri-hydride reduction of zearalanone

A solution of 0.200 g., 0.001 mole of phenyl tin tri-hydride in 35 ml. of ether is added under nitrogen to a solution of 0.300 g., 0.0094 mole of zearalanone in ether at room temperature. In five minutes a white solid precipitates. Excess hydride is destroyed with diethylamine, the insolubles filtered and the ether layer concentrated to yield the active growth factor diastereoisomer of 6-(6,10-dihydroxyundecyl)-β-resorcylic acid-μ-lactose, M.P. 178–179° C., $$[\alpha]_{365}^{25°} = -96.3 \pm .5° \text{ C.}$$

(c.=.79%, MeOH).

EXAMPLE 9

Pyridine-n-butyllithium reduction of zearalanone

A solution of n-butyllithium (5 ml., 0.0025 mole) in dry ether is added dropwise under oxygen-free nitrorgen to an ice cooled solution of 0.800 g. of pyridine in 10 ml. of ether. A solution of 0.300 g., 0.009 mole of zearalanone in 10 ml. ether is then added slowly at room temperature and the mixture stirred overnight. Approximately 10 ml. of 6 N aqueous hydrochloric acid is added to decompose excess reagent. The ether layer is separated and the aqueous layer extracted with ether. The combined ether layers are washed with aqueous sodium bicarbonate and water, then dried over anhydrous sodium sulfate. Concentrating the ether layers in vacuum affords the active growth factor diastereoisomer of 6-(6,10-dihydroxyundercyl)-β-resorcylic acid-μ-lactone, M.P. 176–180° C., $$[\alpha]_{365}^{25°} = -95.2 \pm .5° \text{ C.}$$

(c.=.80%, MeOH).

EXAMPLE 10

Pyridine n-butyllithium reduction of dibenylzearalenone

A solution of n-butyllithium (5 ml., 0.0042 mole) in dry ether is added dropwise under oxygen-free nitrogen to an ice cooled solution of 1.36 g. of pyridine in 10 ml. of ether. A solution of 0.750 g., 0.0015 mole of dibenzylzearalenone in 10 ml. of ether is added slowly at room temperature and the mixture is stirred overnight. Approximately 10 ml. of 6 N aqueous hydrochloric acid is added to decompose excess reagent. The ether layer is separated and the aqueous layer extracted with ether. The ether layers are combined and washed with aqueous sodium bicarbonate and water. After drying over anhydrous sodium sulfate the ether is concentrated in vacuum and the residue hydrogenated over 10% Pd/C to give the active growth factor diastereoisomer of 6-(6,10-dihydroxyundecyl)-β-resorcylic acid-μ-lactone, M.P. 178–182° C., $$[\alpha]_{365}^{25°} = -96.3 \pm .5° \text{ C.}$$

(c.=.81%, MeOH).

EXAMPLE 11

Lithium aluminum tri-t-butoxy hydride reduction of dibenzylzearalanone

Dibenzylzearalanone (0.750 g., 0.0015 mole) in 20 ml. of dry tetrahydrofuran is added at 0° C. under nitrogen to 0.800 g. (0.0031 mole) of lithium aluminum tri-t-butoxy hydride in 20 ml. of dry tetrahydrofuran. After stirring at 0° for one and one-half hours, excess hydride is decomposed by the dropwise addition of 2-3 ml. of water at 0° C. The mixture is concentrated to dryness in vacuum and 25 ml. of water added. The mixture is then extracted with ether and the ether layer is washed with water. After drying over anhydrous sodium sulfate the product is concentrated in vacuum to an oil which is purified by chromatography on silica gel G. This product is hydrogenated with 10% Pd/C to give the active growth factor diastereoisomer of 6-(6,10-dihydroxyundecyl)-β-resorcylic acid-μ-lactone, M.P. 179–181° C., $$[\alpha]_{365}^{25°} = -97.0 \pm .5° \text{ C.}$$

(c.=.86%, MeOH).

Similarly, the reduction at 25° C. gives the active growth factor, M.P. 178–180° C., $$[\alpha]_{365}^{25°} = -97.5 \pm .5° \text{ C.}$$

(c.=.83%, MeOH).

Lithium aluminum hydride at 0° C. yields the active growth factor, M.P. 177–180° C., $$[\alpha]_{365}^{25°} = -98.3 \pm .5° \text{ C.}$$

(c.=.80%, MeOH).

EXAMPLE 12

Aluminum hydride reduction of dibenzylzearalenone

To an ether solution containing 0.0015 mole of aluminum hydride at −70° C. under nitrogen is added 0.750 g. (0.0015 mole) of dibenzylzearalenone in ether. The mixture is stirred for two hours and then excess hydride is decomposed with cold 4 N sulfuric acid solution. The ether layer is then washed with aqueous sodium bicarbonate and water and dried over anhydrous sodium sulfate. After concentration in vacuum the residue is hydrogenated over 10% Pd/C to yield the active growth factor diastereoisomer of 6-(6,10-dihydroxyundecyl)-β-resorcylic acid-μ-lactone, M.P. 178–181° C., $$[\alpha]_{365}^{25°} = -97.9 \pm .5° \text{ C.}$$

(c.=.91%, MeOH).

EXAMPLE 13

Lithium borohydride reduction of dibenzylzearalanone

Lithium borohydride (0.500 g., 0.0230 mole) is added portionwise at 25° C. to a solution of 0.750 g. (0.0015 mole) of dibenzylzearalanone in 50 ml. of tetrahydrofuran. The borohydride insoluble mixture is stirred overnight at room temperature. The excess hydride is decomposed with aqueous sulfuric acid at 0° C. and the tetrahydrofuran is removed in vacuum. The aqueous layer is extracted with ether and the ether layer washed with aqueous sodium bicarbonate and water, then dried over anhydrous sodium sulfate. Concentration in vacuum gives an oil which is purified by chromatography on silica gel. This product is then hydrogenated with 10% Pd/C to give the active growth factor diastereoisomer of 6-(6,10-dihydroxyundecyl)-β-resorcylic acid-μ-lactone, M.P. 177–181° C.

$$[\alpha]_{365}^{25°} = -98.0 \pm .5° \text{ C.}$$

(c.=.91%, MeOH).

Similarly, sodium borohydride (0.200 g., 0.0053 mole) in methanol reduces 0.700 g., 0.0014 mole of dibenzylzearalanone. After hydrogenolysis ($H_2$Pd/C), the active growth factor, M.P. 179–181° C., $$[\alpha]_{365}^{25°} = -97.1 \pm .5° \text{ C.}$$

(c.=.85%, MeOH) is obtained.

Lithium borohydride (0.500 g., 25 mmoles) reduces 0.200 (0.63 mmole) of zearalanone to yield the active growth factor, M.P. 178.5–180° C.

$$[\alpha]_{365}^{25°} = 97.5 \pm .5° \text{ C.}$$

(c.=.82%, MeOH).

EXAMPLE 14

Sodium borohydride reduction of zearalenone

Sodium borohydride (1.0 g., 0.026 mole) is added to a solution of 0.300 g., 0.0094 mole of zearalenone in 40 ml. of methanol. After refluxing for two hours, the reaction is cooled and 10 ml. of water is added. The mixture is acidified with 10 ml. of 10% aqueous hydrochloric acid and concentrated in vacuum to one-half the volume. The oily product is extracted with ether and the organic layer washed with aqueous sodium bicarbonate and water, then dried over anhydrous sodium sulfate. The ether solution is hydrogenated over Pd/C then concentrated in vacuum to give the active growth factor disastereoisomer of 6-(6,10- dihydroxyundecyl)-β-resorcylic acid-μ-lactone, M.P. 179–182° C.

$$[\alpha]_{365}^{25°} = -97.0 \pm .5° \text{ C.}$$

(c.=.85%, MeOH).

Similarly, dibenzylzearalenone (0.750 g., 0.0015 mole) is reduced with 0.225 g., 0.0060 mole of sodium borohydride. Hydrogenation with 10% Pd/C gives the active growth factor, M.P. 177–180° C.

$$[\alpha]_{365}^{25°} = -98.5 \pm .5° \text{ C.}$$

(c.=.89%, MeOH).

EXAMPLE 15

Grignard reduction of dimethylzearalenone

Five ml. of Grignard reagent from (+)-1-chloro-2-phenylbutane (0.001 mole of a 0.02 M THF solution) is added dropwise to a solution of 0.345 g., 0.001 mole of dimethylzearalenone in THF at room temperature. The reaction mixture is hydrolyzed with ice cold ammonium chloride solution after stirring for eighteen hours. The mixture is concentrated to dryness in vacuum and extracted with ether. The extract is hydrogenated over 5% Pd/C to give the dimethyl saturated alcohol, then demethylated with $BF_3$ to give the active growth factor diastereoisomer of 6-(6,10-dihydroxyundecyl)-β-resorcylic acid-μ-lactone, M.P. 178–181° C., $$[\alpha]_{365}^{25°} = 98.5 \pm .5° \text{ C.}$$

(c.=.86%, MeOH).

EXAMPLE 16

Grignard reduction of dibenzylzearalanone (+)-2-phenylbutyl magnesium chloride (7.5 ml. of a 0.2 M solution in THF) is added dropwise under nitrogen to a solution of 0.750 g. (0.0015 mole) of dibenzylzearalanone in 30 ml. of tetrahydrofuran at 25° C. After stirring at room temperature overnight the reaction mixture is hydrolyzed with cold ammonium chloride solution. The mixture is concentrated to dryness in vacuum and extracted with ether. Concentration in vacuum gives an oil which is hydrogenated over 10% Pd/C to yield the active growth factor diastereoisomer of 6-(6,10-dihydroxyundecyl)-β-resorcylic acid-μ-lactone, M.P. 178–180° C.

$$[\alpha]_{365}^{25°} = -97.5 \pm .5° \text{ C.}$$

(c.=.80%, MeOH).

EXAMPLE 17

LiAlH₄: 3-O-benzyl-1,2-O-cyclohexylidene-α-glucofuranoside complex reduction of dibenzylzearalanone Finely powdered 3-O-benzyl-1,2-O-cyclohexylidene-α-D-glucofuranoside (0.425 g., 0.0015 mole) is added to a stirred suspension of 0.057 g. of lithium aluminum hydride in 100 ml. of dry ether under nitrogen. After hydrogen evolution subsides, the suspension is heated to reflux for two hours and a solution of 0.750 g., 0.0015 mole of dibenzylzearalanone in 10 ml. of ether is added dropwise. The reaction is refluxed for an additional two hours, then treated with water. The mixture is filtered and residue extracted with ether. The combined ether extracts are dried and concentrated in vacuum. The residue is hydrogenated over 10% Pd/C to give the active growth factor diastereoisomer of 6-(6,10-dihydroxyundecyl)-β-resorcylic acid-μ-lactone, M.P. 178–182° C.

$$[\alpha]_{365}^{25°} = -98.0 \pm .5° \text{ C.}$$

(c.=.95%, MeOH).

EXAMPLE 18

LiAlH₄: 3-O-benzyl-1,2-O-cyclohexylidene-α-glucofuranoside complex reduction of zearalenone Finely powdered 3-O-benzyl-1,2-O-cyclohexylidene-α-D-glucofuranoside (0.425 g., 0.0015 mole) is added to a stirred suspension of 0.057 g. of lithium aluminum hydride in 100 ml. of dry ether under nitrogen. After hydrogen evolution subsides, the suspension is heated at reflux for two hours and a solution of 0.470 g., 0.0015 mole of zearalenone in 30 ml. of ether is added dropwise. The reaction is refluxed for another two hour period, then diluted with water and filtered. The residue is extracted with ether and the combined ether extracts are dried, then concentrated in vacuum. The residue is hydrogenated over 5% Pd/C to give the active growth factor diastereoisomer of 6-(6,10-dihydroxyundecyl)-β-resorcylic acid-μ-lactone, M.P. 181–182° C., $$[\alpha]_{365}^{25°} = -97.5 \pm .5° \text{ C.}$$

(c.=.91%, MeOH).

What is claimed is:

1. Process for the preparation of the biologically active diastereoisomer of (−)-zearalanol which comprises reacting a compound having the structural formula:

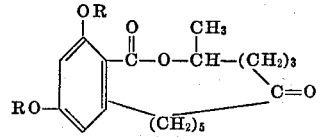

wherein R represents hydrogen, loweralkyl, benzyl; with a carbonyl reducing agent selected from the group consisting of aluminum hydride, diisobutyl aluminum hydride, lithium aluminum hydride, lithium aluminum tri-t-butoxy hydride, tri-isobutyl aluminum, aluminum tri-t-butoxide, disiamyl borane, isopropylamine borane, phenyl tin tri-hydride, triphenyltin hydride, pyridine-n-butyllithium, (+)-2-phenylbutyl magnesium chloride, lithium aluminum hydride: 3-O-benzyl-1,2,-O-cyclohexylidene-α-D-glucofuranoside complex.

2. The process of claim 1 wherein R is hydrogen.
3. The process of claim 1 wherein R is methyl.
4. The process of claim 1 wherein R is benzyl.
5. The process of claim 1 wherein the carbonyl reducing agent is lithium aluminum hydride.
6. The process of claim 1 wherein the carbonyl reducing agent is lithium aluminum tri-t-butoxy hydride.
7. A process for the preparation of the biologically active diastereoisomer of (−) zearalanol which comprises:
   (a) reacting a compound having the structural formula

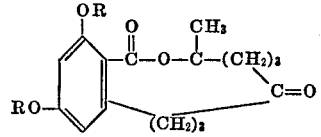

wherein R represents hydrogen, loweralkyl, and benzyl; with a carbonyl reducing agent selected from the group consisting of aluminum hydride, di-isobutyl aluminum hydride, lithium aluminum hydride, lithium aluminum tri-t-butoxy hydride, tri-isobutyl aluminum, aluminum tri-t-butoxide, disiamyl borane, isopropylamine borane, phenyl tin tri-hydride, triphenyltin hydride, pyridine-n-butyl-lithium, (+)-2-phenylbutyl magnesium chloride, and the lithium aluminum hydride: 3 - O - benzyl - 1,2-O-cyclohexylidene-α-D-glucofuranoside complex; and
   (b) hydrogenating the product of step (a) in the presence of palladium catalyst.

References Cited

UNITED STATES PATENTS 3,239,345   3/1966   Hodge et al. _____ 260—343.2 X
3,239,348   3/1966   Hodge et al. _____ 260—343.2 X JOHN M. FORD, Primary Examiner